(12) United States Patent
Moulin

(10) Patent No.: US 11,115,222 B2
(45) Date of Patent: Sep. 7, 2021

(54) METHOD FOR SECURELY REGISTERING A REMOVABLE ELECTRICAL DEVICE WHEN INSTALLING IT WITHIN AN ELECTRICAL SYSTEM

(71) Applicant: Schneider Electric Industries SAS, Rueil Malmaison (FR)

(72) Inventor: Michel Moulin, Coublevie (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 411 days.

(21) Appl. No.: 16/151,882

(22) Filed: Oct. 4, 2018

(65) Prior Publication Data

US 2019/0165952 A1 May 30, 2019

(30) Foreign Application Priority Data

Nov. 28, 2017 (FR) .................................. 17 61258

(51) Int. Cl.
| | |
|---|---|
| *H04L 29/06* | (2006.01) |
| *H04L 9/32* | (2006.01) |
| *G06F 21/44* | (2013.01) |
| *G06F 21/73* | (2013.01) |
| *G06F 21/71* | (2013.01) |

(52) U.S. Cl.
CPC ............ *H04L 9/3263* (2013.01); *G06F 21/44* (2013.01); *G06F 21/71* (2013.01); *G06F 21/73* (2013.01); *H04L 63/0823* (2013.01)

(58) Field of Classification Search
CPC ....... H04L 9/3263; H04L 9/0823; H04L 9/92; G06F 21/44; G06F 21/73

USPC .......................................................... 713/189
See application file for complete search history.

(56) References Cited

U.S. PATENT DOCUMENTS 5,534,848 A * 7/1996 Steele ................. B60R 16/0315
280/5.501
6,233,685 B1 5/2001 Smith et al.
(Continued)

FOREIGN PATENT DOCUMENTS

WO WO 02/065696 A1 8/2002

OTHER PUBLICATIONS

French Preliminary Search Report dated Jun. 18, 2018 in French Application 17 61258, filed on Nov. 28, 2017 (with English Translation of Categories of cited documents & Written Opinion).

*Primary Examiner* — Evans Desrosiers
(74) *Attorney, Agent, or Firm* — Oblon, McClelland, Maier & Neustadt, L.L.P.

(57) ABSTRACT

A method for securely registering a removable electrical device includes steps consisting in: a) prior to the installation of a new removable electrical device within an electrical system in order to replace a faulty removable electrical device, acquiring a first security certificate for the new device, this first certificate being signed by an authority known to the system; b) verifying the authenticity of the first acquired security certificate, this verification being carried out by the electronic control module; c) generating a second security certificate for the new removable electrical device, including a key generated by the electronic computer of the new device; d) obtaining a signature for the second security certificate from a trusted certification authority, the new device then being registered within the system only if this signature is obtained.

11 Claims, 2 Drawing Sheets

(56) References Cited

U.S. PATENT DOCUMENTS

2011/0161659 A1* 6/2011 Himawan ............... H04L 9/006
  713/156
2013/0318343 A1* 11/2013 Bjarnason ............... H04L 63/08
  713/157
2015/0280916 A1   10/2015 Bjarnason et al.

* cited by examiner

METHOD FOR SECURELY REGISTERING A REMOVABLE ELECTRICAL DEVICE WHEN INSTALLING IT WITHIN AN ELECTRICAL SYSTEM

The present invention relates to a method for securely registering a removable electrical device when installing it within an electrical system in order to replace a faulty removable electrical device.

Notably, the invention relates to the field of electrical switching and/or electrical protection devices equipped with embedded electronic computers.

In a known way, numerous electrical switching and/or electrical protection devices, such as circuit breakers, contactors, or measurement and monitoring devices, are provided with electronic computers for carrying out remote operation and control functions. Such devices are said to be "communicating".

These electrical devices are intended to interact with an electrical system such as an electrical panel or enclosure, so that they can be connected to an electrical installation on which they are intended to act, and can also be connected to a communication network within which they can communicate. Such systems are, for example, used in an industrial environment, to control the electricity supply to various pieces of equipment in an industrial installation.

These electrical devices are usually connected to the electrical system removably so as to facilitate their connection, and especially their replacement, in the course of maintenance operations for example.

However, for reasons of security, it is desirable that only previously authorized electrical devices should be connectable within the electrical system. Otherwise, fraudulently modified electrical devices could be installed within the system without the knowledge of the system administrators, with the aim of damaging the system, constituting an unacceptable loss of security.

Thus, typically, when such an electrical device is installed or replaced, it must be registered within the electrical system before it can be used. For reasons of security, the registration operation must be carried out by a person having specific security privileges, for example a system administrator.

In practice, however, the system administrator is not always available to proceed with the registration at the appropriate time. This is because, in an industrial installation, the number of electrical devices is usually high, and these devices may be geographically dispersed over a wide area. Furthermore, in the industrial context, if a fault occurs the faulty device must usually be replaced very rapidly, to avoid adverse effects on the use of the industrial installation. In practice, there are maintenance operatives who can take rapid action on electrical devices if faults occur, but, here again, for reasons of security, it is undesirable for them to have the same privileges as the system administrator.

The invention is intended, more particularly, to overcome these problems, by proposing a method for securely registering a removable electrical device when installing it within an electrical system, the use of which is facilitated without thereby compromising the computer security of the system.

For this purpose, the invention relates to a method for securely registering a removable electrical device when installing it within an electrical system in order to replace a faulty removable electrical device, characterized in that the method includes the steps of:

a) after the installation of a new removable electrical device within an electrical system in order to replace a faulty removable electrical device of this electrical system, acquiring automatically, by means of an electronic control module of the electrical system, a first security certificate for the new removable electrical device, stored in a computer memory of an embedded electronic computer of the new removable electrical device, this first certificate being signed by an authority known to the system;

b) verifying the authenticity of the first acquired security certificate, this verification being carried out by the electronic control module;

c) generating a second security certificate for the new removable electrical device, this second security certificate including a key generated by the electronic computer of the new removable electrical device;

d) obtaining a signature for the second security certificate from a trusted certification authority, the new removable electrical device then being registered within the electrical system only if this signature is obtained.

As a result of the invention, the use of security certificates specific to each removable device, associated with a trusted certification authority, enables a maintenance operator responsible for replacing a faulty device to register the device that has been newly installed to replace a faulty device, without having to obtain high-level security clearance. This facilitates the registration of removable devices within the system at the time of replacement, without compromising the computer security of the system as a whole.

According to advantageous but non-essential aspects of the invention, such a method of registering a removable electrical device within an electrical system may incorporate one or more of the following characteristics, considered in isolation or in any technically feasible combination:

In step b), the verification is carried out by using a public certificate from the body that has issued the first certificate, this public certificate being held by the system.

In step b), the verification is carried out by the trusted certification authority.

The method further comprises, after step a), a step of identifying the new removable electrical device on the basis of identification data contained in the first security certificate acquired, the registration of the new removable electrical device being refused if this new removable electrical device is not identified as one corresponding to the faulty removable electrical device which it replaces within the electrical system.

The method comprises a step of revoking the first security certificate at the certification authority, when the new removable electrical device has been registered within the electrical system at the end of step d).

The method further comprises, before step a), steps of:
y) acquiring a registration request issued by an operator, from a user interface of the control module;
z) in response, authenticating the operator by acquiring an identifier supplied by the operator via the user interface, the operator being considered to be authenticated only if the acquired identifier corresponds to a previously authorized predetermined identifier, steps a) to d) not being executed if the operator is not authenticated at the end of this step z).

The execution of steps a) to d) is authorized only if a removable electrical device installed within the electrical system has been detected as being faulty, the method comprising for this purpose, before step a), a step of detecting a fault in a removable electrical device installed within the electrical system.

The step of detecting a fault comprises detecting a loss of a communication link between the embedded computer of the removable electrical device and the control module of the electrical system.

The method comprises a step of generating the second security certificate, by means of the embedded electronic computer of the removable electrical device.

The second security certificate is generated by a cryptographic unit of the embedded electronic computer of the removable electrical device.

The method comprises a step consisting in physically replacing a faulty removable electrical device of the electrical system with a new removable electrical device, followed by steps consisting in registering the new removable electrical device within the electrical system by executing steps a) to d) as described above.

According to another aspect, the invention relates to an electrical system comprising at least one removable electrical device equipped with an embedded electronic computer, this electrical system comprising an electronic control module, characterized in that the electronic control module is programmed to execute steps consisting in:

a) after the installation of a new removable electrical device within an electrical system in order to replace a faulty removable electrical device of this electrical system, acquiring automatically a first security certificate for the new removable electrical device, stored in a computer memory of the embedded electronic computer of the new removable electrical device, this first certificate being signed by an authority known to the system;

b) verifying the authenticity of the first acquired security certificate, this verification being carried out by the electronic control module;

c) generating a second security certificate for the new removable electrical device, this second security certificate including a key generated by the electronic computer of the new removable electrical device;

d) obtaining a signature for the second security certificate from a trusted certification authority, the new removable electrical device then being registered within the electrical system only if this signature is obtained.

The invention will be more readily understood and other advantages thereof will be more fully apparent in the light of the following description of an embodiment of a method for registering a removable electrical device within an electrical system, provided purely by way of example with reference to the attached drawings, in which:

FIG. 1 shows an electrical system 2 comprising removable electrical devices 4A, 4B, 4C.

The system 2 is here associated with an electrical installation, in an industrial environment for example, such as an electricity distribution network for supplying a plurality of power devices. For example, the system 2 is an electrical panel or an electrical enclosure.

Figure 1:
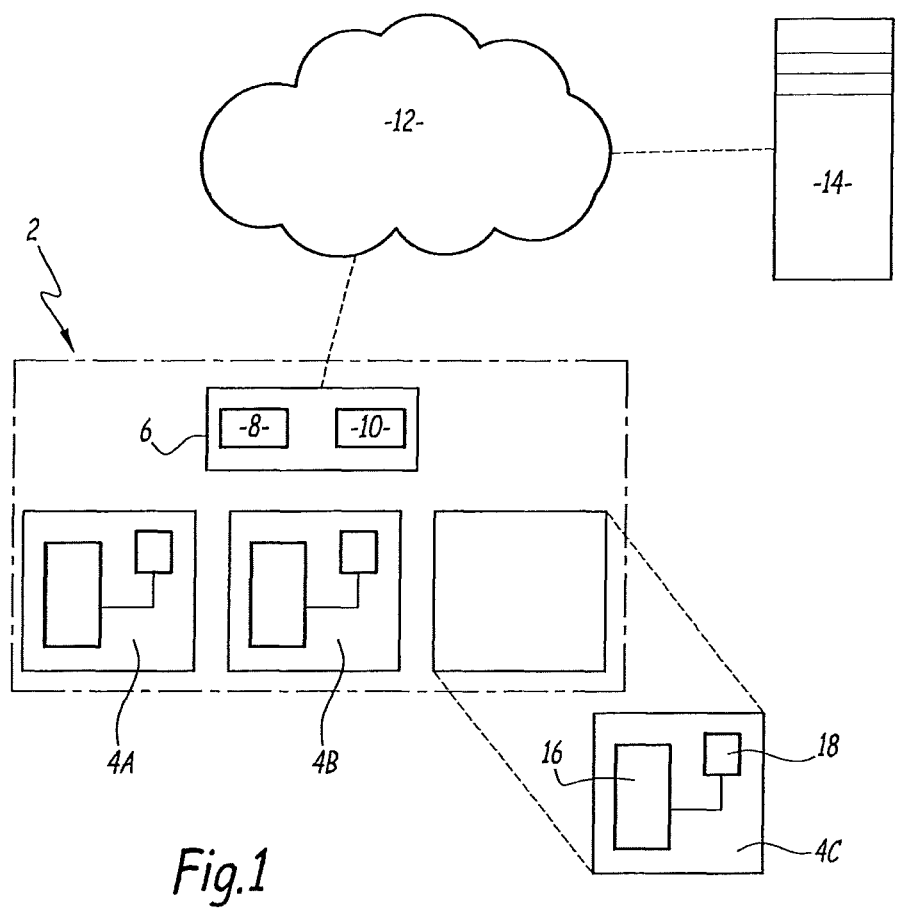
FIG. 1 is a schematic representation of an electrical system comprising at least one removable electrical device according to the invention.

The term "removable" is here taken to mean that each electrical device 4A, 4B, 4C is removable relative to the system 2, in a reversible way, between a connected position in which it is connected to the system 2 and a withdrawn position in which it is disconnected from the system 2. In FIG. 1, the devices 4A and 4B are shown in their connected position and the device 4C is shown in the withdrawn position.

According to one embodiment, the system 2 comprises housings, each adapted to receive a device 4A, 4B, 4C, together with guiding and fastening means to facilitate the movement of the devices 4A, 4B, 4C and their securing in the connected position. For example, the devices 4A, 4B, 4C are movable by translation. For example, the devices 4A, 4B, 4C are movable by translation. The devices may also be mounted on a rail while being removable.

The electrical devices 4A, 4B, 4C are, for example, electrical protection and switching devices such as circuit breakers. In a variant, they may be contactors or devices for measuring one or more electrical quantities, or a device for monitoring the operation of the electrical installation.

These electrical devices 4A, 4B, 4C are here described as three in number, and are identical to one another here, in the interests of simplicity. In practice, however, the number of removable devices 4A, 4B, 4C may be different.

Similarly, these removable devices 4A, 4B, 4C are not necessarily identical to one another, and may be different. For example, the same system 2 may receive removable devices 4A, 4B, 4C of different kinds, for example a circuit breaker and a device for measuring an electrical quantity.

The system 2 further comprises an electronic control module 6 comprising a programmable electronic computer 8 and a user interface 10.

For example, the computer 8 comprises a logical calculation unit such as a microprocessor or a microcontroller, together with a data recording medium such as a computer memory, preferably non-volatile, these two components being interconnected. The data recording medium comprises executable instructions for the operation of the control module 6, notably for executing the method of FIG. 3 described below.

The interface 10 here comprises an electronic screen, for example a liquid crystal screen or, in a variant, a screen of the plasma or organic light-emitting diode type. This electronic screen is suitable for displaying data to an operator. The interface 10 also comprises data capture means such as a keyboard or a touchscreen.

According to other embodiments, the interface 10 is physically remote from the system 2. For example, the interface 10 is installed at a distance from the system 2 while still being connected thereto. In a variant, the interface 10 may take the form of a website that can be accessed by means of a computer or a mobile communication device of the tablet or mobile telephone type.

The module 6 also comprises a communications interface, such as a network interface, providing a data link 12 to one or more remote computer devices. For example, the link 12 is provided by means of a communications network 12, such as a local communication network of the type known as a LAN (for "Local Area Network").

In particular, the link 12 enables the module 6 to connect itself to a server 14 which is adapted to act as a certification authority, as described below. The server 14, also called the certification authority (CA), thus forms a trusted third party known to the system 2.

The devices 4A, 4B, 4C are each equipped with a controllable electrical device 16 and an embedded electronic computer 18 configured to provide functions of remote control and operation of the device 16.

The device 16 is, notably, intended to be connected to one or more power lines carrying an electric current. In fact, the device 16 forms the core of the device 4A, 4B, 4C and enables it to perform its functions.

In this example, since the devices 4A, 4B, 4C are circuit breakers, the device 16 is an electromechanical apparatus for cutting off an electric current, comprising, notably, a breaking unit with separable contacts and a mechanism for triggering this breaking unit.

In variants, if the devices 4A, 4B, 4C have a different function from that of a circuit breaker, the device 16 is modified accordingly.

When the device 4A, 4B, 4C is in the position of connection to the system 2, the device 16 is connected to the electrical installation associated with the system 2, for example via one or more power conductors (not shown) arranged within the system 2.

Similarly, when the device 4A, 4B, 4C is in the position of connection to the system 2, the computer 18 is able to communicate with the control module 6, for example via a wire data bus (not shown) arranged within the system 2.

Figure 2:
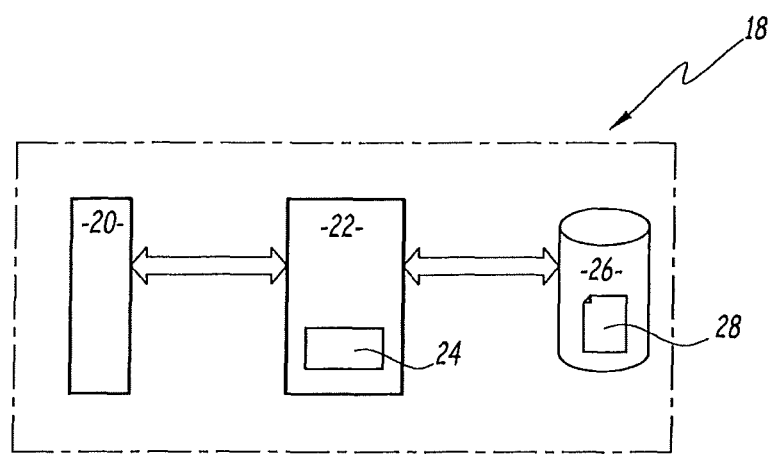
FIG. 2 is a schematic representation of an electronic computer with which the electrical device of FIG. 1 is equipped.

As shown in FIG. 2, the computer 18 here comprises a data input/output interface 20, a logical processor 22, a cryptographic unit 24 and a computer memory 26.

The processor 22 here comprises a programmable microcontroller or a microprocessor.

The cryptographic unit 24 is a secure processor, also known as a cryptoprocessor, or as a "trusted platform module" in English. The unit 24 is, notably, capable of securely generating and storing a private cryptographic key, for example in order to implement a public key signature mechanism.

In a variant, the cryptographic unit 24 is omitted.

The memory 26 stores executable instructions for the operation of the device 4A, 4B, 4C. Here, it also contains a security certificate 28 allowing the individual authentication of the device 4A, 4B, 4C.

For example, the security certificate 28 comprises a plurality of fields, each containing a data element, which may, by way of example, include a serial number for uniquely identifying the device 4A, 4B, 4C, a software version number, the name of the issuer of the certificate, dates of validity of the certificate, and the reference of the algorithm used to sign the certificate. According to an example, the certificate 28 supplied by default is a factory certificate installed by the manufacturer of the device.

In this example, the certification authority 14 forms part of a trust chain which incorporates a plurality of certification authorities, according to a hierarchical tree in this case. For example, the trust chain comprises a root authority, to which one or more lower-rank certification authorities are attached. Each of these certification authorities has one or more other certification authorities of an even lower rank attached to it, and so on. Each trusted authority is authorized to sign the security certificates of the certification authorities dependent on it. Such a trust chain is known, and is therefore not described in greater detail.

For example, a first level of the trust chain corresponds to a root authority associated with a body such as a business. The level immediately below corresponds to divisions of this body. The level below that corresponds to geographical sites, such as production sites, attached to these divisions.

An example of the execution of a method for replacing one of the devices 4A, 4B or 4C is now described with reference to the flow diagram of FIG. 3 and with the aid of FIGS. 1 and 2.

Initially, the devices 4A, 4B and 4C are connected to the system 2 and are in an operating state. For example, the devices 4A, 4B, 4C are connected in the same network. One of these devices, for example device 4C, then becomes faulty and ceases to operate normally, and must therefore be replaced by another specimen of a removable device of the same type.

Advantageously, the control module 6 is configured to detect the fault in device 4C, for example by automatically detecting a loss of the communication link between the embedded computer 18 of the removable electrical device 4C and the control module 6 while the device 4C is still in the connected position, being contained in its housing within the system 2, for example. This detection may be carried out with the aid of a position sensor installed in the housing of the system 2.

The replacement must then be performed by an operator, manually, by withdrawing the faulty device 4C from the system 2, and then by installing a new specimen of this device 4C, hereinafter referred to as a "new removable device". During this installation, the new device 4C is brought towards the connected position so as to be connected to the system 2.

However, for reasons of security, the control module 6 does not allow the new device 4C to be functionally integrated into the system until the new device 4C has been registered within the system 2, in order to verify its authenticity.

Figure 3:
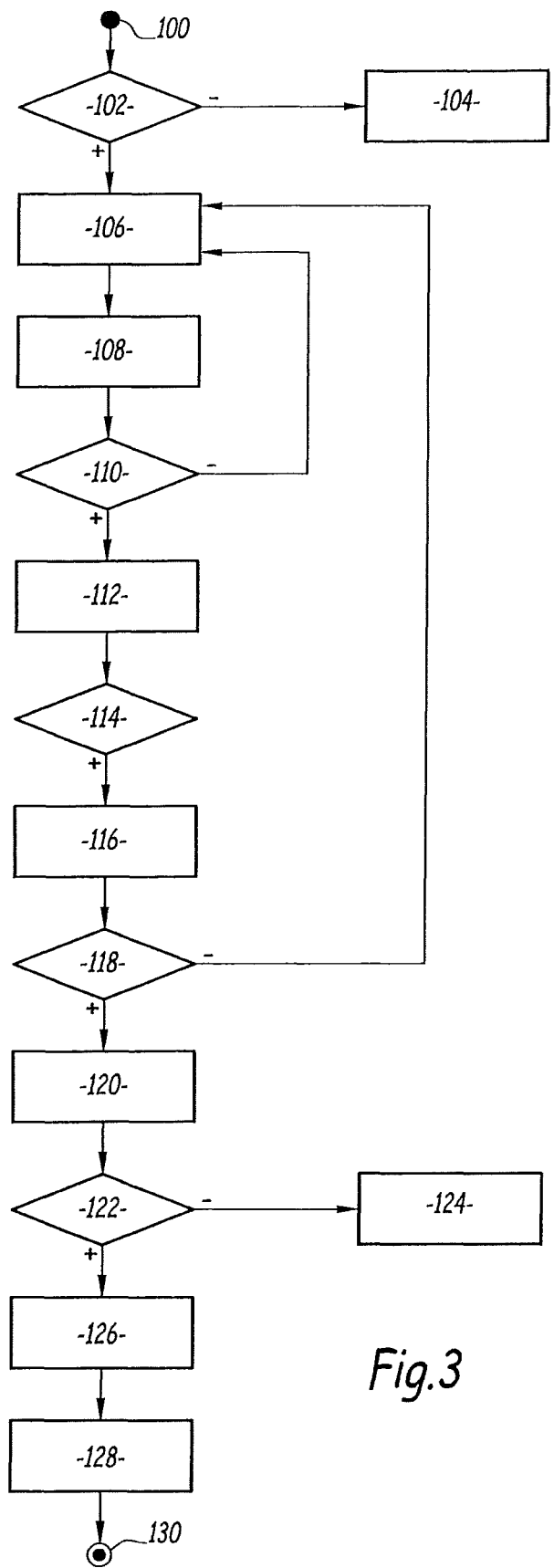
FIG. 3 is a flow diagram of a method according to the invention for securely registering a removable electrical device when installing it within an electrical system of FIG. 1, in order to replace a faulty removable electrical device.

For this purpose, the module 6 executes the automatic registration method described in FIG. 3. This method starts with an initialization step 100. For example, this step 100 starts after a request sent by the operator on the interface 10 of the module 6.

Advantageously, the initialization step 100 cannot be executed unless the module 6 has previously detected the fault in the faulty device. This ensures that an operator cannot install a new device without a valid reason in place of a normally operating device and then request the registration of this new device within the system 2.

The method then comprises a step 102 of authenticating the operator. For example, the module 6 automatically sends to the operator, via the interface 10, an invitation to supply a predefined identifier, for example one formed by a user name and a password. In response, the operator must supply this identifier.

The module then acquires the identifier supplied by the operator on the interface 10, then compares it with a list of identifiers authorized for carrying out maintenance operations.

If the acquired identifier does not correspond to a previously authorized predefined identifier, then, in a step 104, the operator is not considered to be authenticated and the registration method is halted.

Conversely, if the acquired identifier corresponds to a previously authorized predefined identifier, then, in a step 106, the operator is considered to be authenticated.

Then, in a step 108, the module 6 grants authorization to the operator to replace the faulty device. For example, this authorization is given after the operator has been authenticated and after he has sent a request to replace the device, via the interface 10 in this case.

When the operator has proceeded to replace the faulty device with the new device 4C, the module 6 automatically verifies, in a step 110, whether the new device 4C has actually been connected to the system 2. For example, the module 6 attempts to connect to the interface 20 of the embedded computer 18, via the data bus of the system 2.

If the new device 4C is not detected at the end of this verification, the replacement is considered to have failed, and the new device 4C must, in turn, be replaced by the operator. For example, the method returns to step 108.

In the contrary case, if the new device 4C is correctly detected at the end of step 110, then, in a step 112, the module 6 connects to the computer 18 to retrieve the certificate 28 contained in the memory 26 of the computer 18. For example, the module 6 sends a request to the controller 18 for the latter to transmit the certificate 28 to the module 6. This certificate 28 is then stored in the data recording medium of the computer 8 of the module 6.

This connection may be provided here via a secure link, for example one conforming to a secure connection protocol such as a TLS (for Transport Security Layer). This is not essential, but in this case a procedure advantageously makes it possible to verify that the product is actually the processor of the private key associated with the factory certificate, for example a random element generated by the module 6 and signed by the new device 4C.

Advantageously, during this step 112, the module 6 does not retrieve the certificate 28 until the operator has authorized this in advance, via the interface 10 for example.

At this stage, the new device 4C contains a standard certificate, called a factory certificate, which is not recognized by the system 2 as a trusted certificate, because it is not issued by the certification authority 14 trusted by the system 2. However, this factory certificate is issued by a known authority which in this case is attached to the certification authority by a trust chain. For example, this factory certificate is issued by the manufacturer of the device 4C. In this example, this factory certificate is also called a "first security certificate". In other words, the first certificate is signed by an authority known to the system 2. At this stage, however, the module 6 does not know that this first certificate is signed by a known authority.

In a step 114, the authenticity of the acquired certificate 28 is automatically verified by the module 6. This verification may be carried out with the aid of a certification authority trusted by the module 6, in this case the server 14.

For example, the module 6 extracts the signature from the certificate 28 and verifies with the authority 14, or with the manufacturer's certificate, via the link 12, whether this signature corresponds to a certification authority which is connected by a trust chain to a known root certification authority.

Alternatively, this verification is carried out by using data embedded in the device 4C, such as the public certificate of the body that has issued and signed the factory certificate of the product. The aim is to verify that the device 4C actually originates from the manufacturer. The manufacturer supplies the corresponding public certificate. In other words, this verification is carried out by using a public certificate from the body that has issued the first certificate, this public certificate being held by the system 2.

In practice, the use of a public certificate guaranteeing the authenticity of the factory certificate is preferable when a secure link 12 to the authority 14 is not available. For this purpose, the manufacturer's public certificate is preferably installed in the module 6. It is, for example, installed there solely by a suitably authorized person.

If the authenticity of the factory certificate 28 cannot be verified, or if the verification results in a negative conclusion, the certificate is not authenticated, and the registration of the new device 4C is refused. The device 4C cannot operate within the system 2, even if it is physically installed in the system 2.

In the contrary case, if the authenticity of the factory certificate 28 is validated at the end of this step 114, then, advantageously, in a step 116, identification data contained in the factory certificate 28 are acquired by the module 6, for example by reading the content of the corresponding data field or fields.

The identification data may be used, notably, to identify the nature of the device 4C. For example, the identification data comprise a product reference which uniquely identifies the device 4C, or at least the type of the device 4C. In this example, the identification data comprise a serial number of the new device 4C. This serial number may be accompanied by a software version number of the operating system used by the embedded computer 18.

Then, in a step 118, the module 6 automatically verifies whether the device 4C is of the same type as the faulty device that has been replaced. This verification is carried out on the basis of the identification data acquired in step 116. For example, these identification data are compared with reference data recorded by the module 6.

If, at the end of this step 118, the new device 4C is identified as not corresponding to the faulty device that has been replaced, the replacement of the faulty device is considered to have failed, and the new device 4C must be replaced by the operator. For example, the method returns to step 108.

Conversely, if the new device 4C is identified as corresponding to the faulty device, the new device is considered to have been physically installed. At this stage, however, the new device 4C is not functionally integrated into the system 2. Advantageously, in step 120, a confirmation that the device has been physically installed is sent to the operator via the interface 10.

Then, in a step 122, the module 4C generates a key to form a new certificate.

In the following text, this certificate and this key form a second security certificate, also referred to below as the "new certificate". This second certificate is different from the first security certificate, or factory certificate.

In this example, the second certificate is created automatically by the computer 18 on the basis of the data contained in the first certificate, from which it takes at least the identification data. This new security certificate, and notably the key, are preferably generated by the cryptographic unit 26 of the computer 6. In a variant, however, when this unit 26 is omitted, the second certificate is generated by the processor 22.

The second certificate differs notably from the first certificate in that it is not, at this stage, signed by a certification authority known to the system 2.

A request is then sent to have this new certificate signed by the authority 14.

For example, this request is generated and sent by the device 4C. The request may be relayed by the module 6. In a variant, the device 4C does not use the module 6 for sending this request, for example if it has access to the server 14.

In response to this request, if the certification authority 14 considers that it can sign this second certificate, it signs it and then returns it to the module 6 or to the device 4C.

If the signed second certificate is not received within a predefined time interval, owing to a fault in the link 12 for example, or because the authority 14 is unable to sign the second certificate, then the registration method is automatically stopped at a step 124.

Conversely, if the signed second certificate is correctly received by the module 6 or by the device 4C, then, in a step 126, the device 4C uses this signed second certificate in place of the factory certificate. The new device 4C is then considered to be registered within the system 2 and may operate normally within this system 2.

In other words, at the end of registration, the factory certificate of the new device 4C is replaced with a second security certificate, signed by the local certification authority which is known to the system 2 and which is trusted by the system 2.

This indicates that the authenticity of the new device 4C is recognized.

Advantageously, in a step 128 following step 126, the first security certificate, that is to say the certificate of the faulty module that has been replaced, is revoked at the certification authority 14, once the new removable electrical device 4C has been registered within the system 2. Here, this revocation is requested by the module 6 by sending a request to this effect to the authority 14 via the link 12. All the elements of the system are then informed that the certificate is revoked and therefore cannot be used.

This ensures that the faulty device that has been replaced cannot be reintegrated into the system 2 or into another electrical system using the same trust chain.

The registration method terminates in a final step 130.

Advantageously, at the end of this step 130, the module 6 automatically supplies the computer 18 with the predefined configuration parameters. These parameters are, for example, recorded in the computer 8 and correspond to operating parameters used by the former device.

As a result of the invention, the use of security certificates specific to each removable device, associated with a trusted certification authority, enables a maintenance operator responsible for replacing a faulty device to register the device that has been newly installed to replace a faulty device, without having to obtain high-level security clearance. This facilitates the registration of removable devices within the system at the time of replacement, without compromising the computer security of the system as a whole.

The method described above may be advantageously used for simultaneously replacing a plurality of faulty removable devices within the same system 2. In this case, the steps described above are reiterated for each of the replaced devices.

However, a problem may arise when the faulty devices are similar to one another, being the same model and having the same function, for example. Step 118 may then be modified to enable the system 2 to know which of the faulty devices has been replaced. For example, the operator is invited to enter, via the interface 10, an identifier designating the device that he has just replaced. These data are recorded in a monitoring log by the module 6, accompanied by time stamp information and the operator's identifier, to ensure the traceability of the operation in case of further problems.

The embodiments and variants considered above may be combined with one another to create new embodiments.

The invention claimed is:

1. A method for securely registering a removable electrical device when installing it within an electrical system in order to replace a faulty removable electrical device, wherein the method comprises the steps of:
a) after the installation of a new removable electrical device, which is a circuit breaker device, within an electrical system in order to replace a faulty removable electrical device of this electrical system, acquiring automatically, with an electronic control module of the electrical system, a first security certificate for the new removable electrical device, stored in a computer memory of an embedded electronic computer of the new removable electrical device, said first certificate being signed by an authority known to the system;
b) verifying the authenticity of the first acquired security certificate, said verification being carried out by the electronic control module;
c) generating a second security certificate for the new removable electrical device, said second security certificate including a key generated by the electronic computer of the new removable electrical device;
d) obtaining a signature for the second security certificate from a trusted certification authority, the new removable electrical device then being registered within the electrical system only if said signature is obtained,
wherein after step a), the method includes a step of identifying the new removable electrical device on the basis of identification data contained in the first security certificate acquired, the registration of the new removable electrical device being refused if said new removable electrical device is not identified as a same type as the faulty removable electrical device which it replaces within the electrical system.

2. The method according to claim 1, wherein, in step b), the verification is carried out by using a public certificate from the body that has issued the first certificate, said public certificate being held by the system.

3. The method according to claim 1, wherein, in step b), the verification is carried out by the trusted certification authority.

4. The method according to claim 1, comprising a step of revoking the first security certificate at the certification authority, when the new removable electrical device has been registered within the electrical system at the end of step d).

5. The method according to claim 1, further comprises, before step a), steps consisting in:
y) acquiring a registration request issued by an operator, from a user interface of the control module;
z) in response, authenticating the operator by acquiring an identifier supplied by the operator via the user interface, the operator being considered to be authenticated only if the acquired identifier corresponds to a previously authorized predetermined identifier, steps a) to d) not being executed if the operator is not authenticated at the end of said step z).

6. The method according to claim 1, wherein the execution of steps a) to d) is authorized only if a removable electrical device installed within the electrical system has been detected as being faulty, the method comprising for said purpose, before step a), a step of detecting a fault in a removable electrical device installed within the electrical system.

7. The method according to claim 6, wherein the step of detecting a fault comprises detecting a loss of a communication link between the embedded computer of the removable electrical device and the control module of the electrical system.

8. The method according to claim 1, comprises a step of generating the second security certificate, with the embedded electronic computer of the removable electrical device.

9. The method according to claim 8, wherein the second security certificate is generated by a cryptographic unit of the embedded electronic computer of the removable electrical device.

10. The method of replacing a removable electrical device within an electrical system, said method further comprises a step consisting in physically replacing a faulty removable electrical device of the electrical system with a new removable electrical device, followed by steps consisting in registering the new removable electrical device within the electrical system by executing steps a) to d) as described above.

11. An electrical system comprising at least one removable electrical device equipped with an embedded electronic computer, said electrical system comprising an electronic control module, wherein the electronic control module is programmed to execute steps comprising:

a) after the installation of a new removable electrical device, which is a circuit breaker device, within an electrical system in order to replace a faulty removable electrical device of said electrical system, acquiring automatically a first security certificate for the new removable electrical device, stored in a computer memory of an embedded electronic computer of the new removable electrical device, said first certificate being signed by an authority known to the system;

b) verifying the authenticity of the first acquired security certificate, said verification being carried out by the electronic control module;

c) generating a second security certificate for the new removable electrical device, said second security certificate including a key generated by the electronic computer of the new removable electrical device;

d) obtaining a signature for the second security certificate from a trusted certification authority, the new removable electrical device then being registered within the electrical system only if said signature is obtained, wherein after step a), the electronic control module is programmed to execute a step of identifying the new removable electrical device on the basis of identification data contained in the first security certificate acquired, the registration of the new removable electrical device being refused if said new removable electrical device is not identified as a same type as the faulty removable electrical device which it replaces within the electrical system.

* * * * *